Patented Mar. 4, 1930

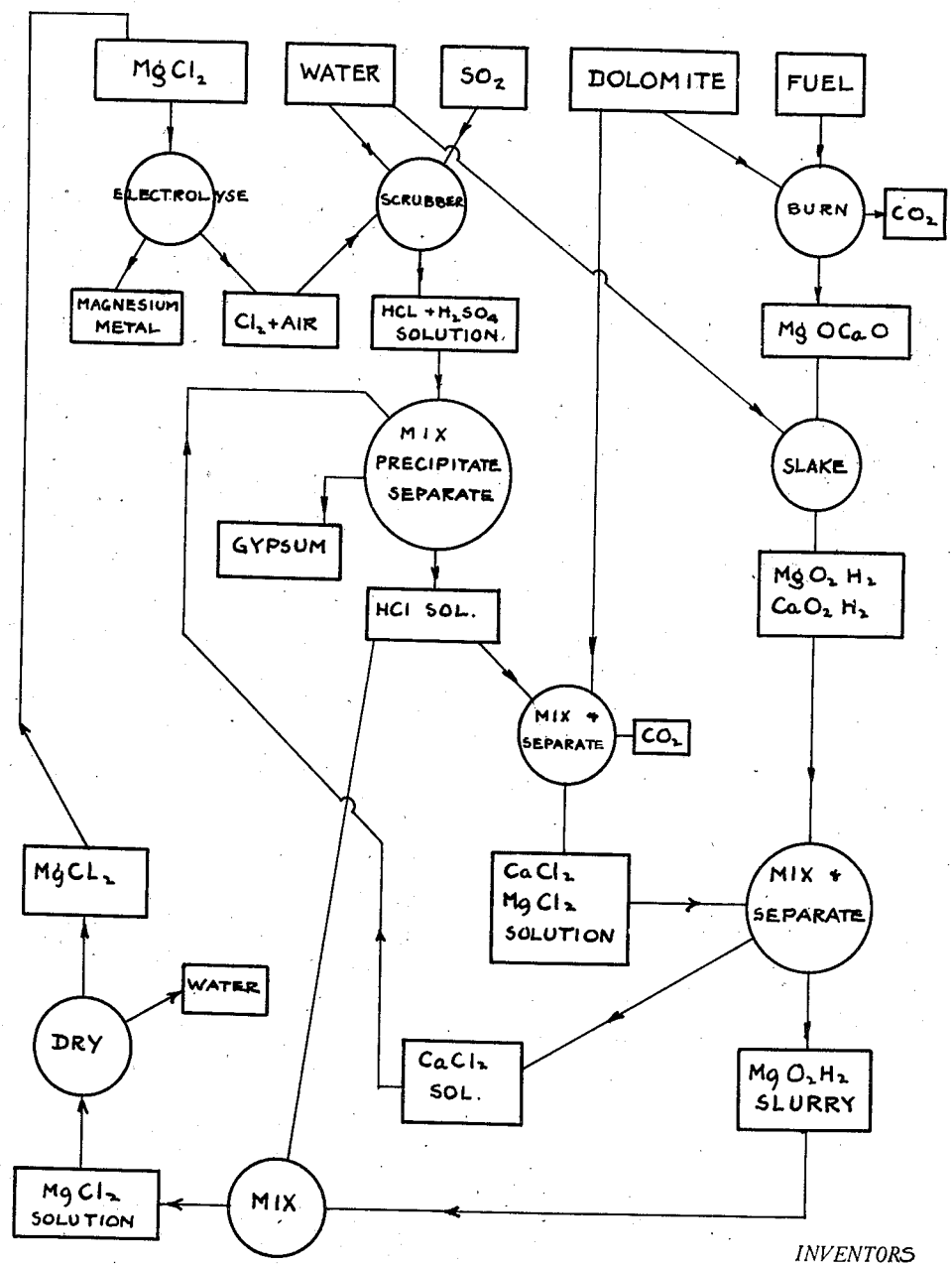

1,749,211

UNITED STATES PATENT OFFICE

HERBERT H. DOW AND EDWIN O. BARSTOW, OF MIDLAND, MICHIGAN, ASSIGNORS TO THE DOW CHEMICAL COMPANY, OF MIDLAND, MICHIGAN, A CORPORATION OF MICHIGAN

PRODUCTION OF METALLIC MAGNESIUM, ETC., FROM DOLOMITE OR MAGNESIAN LIMESTONE

Application filed November 8, 1926. Serial No. 147,179.

In a copending application, Serial No. 145,376 filed by us October 30, 1926, there was set forth a process for obtaining metallic magnesium electrolytically and by the aid of dolomite. With some grades of material however, it is desirable to provide somewhat different procedure in certain respects. Moreover, further economies in operation may be effected.

To the accomplishment of the foregoing and related ends, the invention, then, consists of the steps hereinafter fully described, and particularly pointed out in the claims, the following description and the annexed drawing setting forth in detail but one of the various ways in which the principle of the invention may be used.

In said annexed drawing, there is shown a flow sheet illustrative of the steps contemplated in the present invention.

In accordance with the present invention as indicated in the drawing, magnesium chloride is electrolyzed in a molten bath, and the hot chlorine is cooled and drawn off in a current of air and mixed with sulphur dioxide and the mingled gases are then subjected to the action of water, for instance in a scrubber tower or the like. The acid liquor obtained, after recycling through the tower if desired, is mixed with an aqueous solution of calcium chloride, preferably that obtained as hereinafter. The reactions involved may be illustrated as follows:—

(1) $2MgCl_2 \rightarrow Mg_2 + 2Cl_2$.
(2) $2Cl_2 + 2SO_2 + 4H_2O \rightarrow 4HCl + 2H_2SO_4$.
(3) $4HCl + 2H_2SO_4 + 2CaCl_2 \rightarrow 2CaSO_4 + 8HCl$.

Part of the hydrochloric acid so provided is reacted upon dolomite, i. e. any commercially practicable magnesium and calcium limestone, and the mixed calcium chloride and magnesium chloride obtained is then reacted with slaked burned dolomite, $Mg(OH)_2 \cdot Ca(OH)_2$, as for example:

(4) $4HCl + CaCO_3MgCO_3 \rightarrow CaCl_2 + MgCl_2 + 2CO_2 + 2H_2O$.
(5) 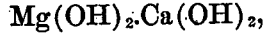
$\rightarrow 2CaCl_2 + 2Mg(OH)_2$.

The calcium chloride resulting is reacted with the acid liquor as in (3) above, while the magnesium hydroxide is treated with the other part of the hydrochloric acid produced by (3).

(6) $4HCl + 2Mg(OH)_2 \rightarrow 2MgCl_2 + 4H_2O$.

The latter operation results in magnesium chloride, which is turned back to the electrolytic cell.

As will thus be seen, the electrolytic cell may be continuously operated, the magnesium chloride therefor coming from the dolomite, the magnesium produced in the cell being taken off, and the chlorine being directed into the cycle, as seen. As a result, the cyclic process may be maintained in a practically self balanced manner and even the by-product, calcium sulphate may be converted into a saleable product.

While for a better understanding of the invention, the reactions concerned have been described as though distinctly separate in steps, we may where desired, in effect combine certain of these. For instance the calcium chloride may be added at the same time as sulphur dioxide or along with the water, when the chlorine and sulphur dioxide are subjected to the action of the water. Again, the dolomite may be present at the time the hydrochloric acid is reacting upon the calcium chloride and a simultaneous reaction of the hydrochloric acid upon the dolomite may be had. In combining the steps however, the calcium sulphate produced would not be of such good commercial grade and there would also be a tendency for calcium sulphate to form a coating upon the dolomite.

Other modes of applying the principle of the invention may be employed, change being made as regards the details described, provided the steps stated by any of the following claims, or the equivalent of such, be employed.

We therefore particularly point out and distinctly claim as our invention:—

1. A cyclic process of making magnesium and magnesium chloride, wherein dolomite is utilized as the ultimate source of such magnesium, which comprises electrolyzing magnesium chloride to produce magnesium and chlorine, reacting the chlorine with sulphur dioxide and water whereby hydrochloric and sulphuric acids are formed, removing the sulphuric acid by treating with calcium chloride and thereby forming an amount of hydrochloric acid additional to that first formed, reacting a portion of such hydrochloric acid with raw dolomite, treating the resulting solution with hydrated calcined dolomite, separating magnesium hydroxide from the solution of calcium chloride, returning the calcium chloride to the above mentioned third step, treating the magnesium hydroxide with the remaining portion of hydrochloric acid from said third step, dehydrating the magnesium chloride so formed, and returning the dried chloride to the above mentioned first step.

2. In a cyclic process of making magnesium and magnesium chloride, wherein magnesium chloride is electrolyzed to produce magnesium and chlorine, the steps which consist in converting such chlorine to hydrochloric acid, reacting with a portion of such acid upon raw dolomite, treating the resulting solution of magnesium and calcium chlorides with hydrated calcined dolomite, separating magnesium hydroxide, and dissolving the latter with the remaining portion of hydrochloric acid.

3. A cyclic process of making magnesium and magnesium chloride, which comprises electrolyzing magnesium chloride, reacting the chlorine so formed with sulphur dioxide and water, whereby a solution of hydrochloric and sulphuric acids is formed, adding calcium chloride to such acid solution whereby a further amount of hydrochloric acid equivalent to the sulphuric acid is formed, reacting upon raw dolomite with a part of such hydrochloric acid, treating the resultant mixed chlorides of calcium and magnesium with slaked burned dolomite thereby obtaining calcium chloride and magnesium hydroxide, returning the calcium chloride to the solution of hydrochloric and sulphuric acids aforementioned, treating the magnesium hydroxide with the other part of the hydrochloric acid to form magnesium chloride, and supplying such magnesium chloride to the electrolysis aforementioned.

Signed by us this 4" day of November, 1926.

HERBERT H. DOW.
EDWIN O. BARSTOW.